Oct. 10, 1950        H. A. FREEMAN        2,525,662
HOSE VULCANIZING APPARATUS
Filed May 7, 1948
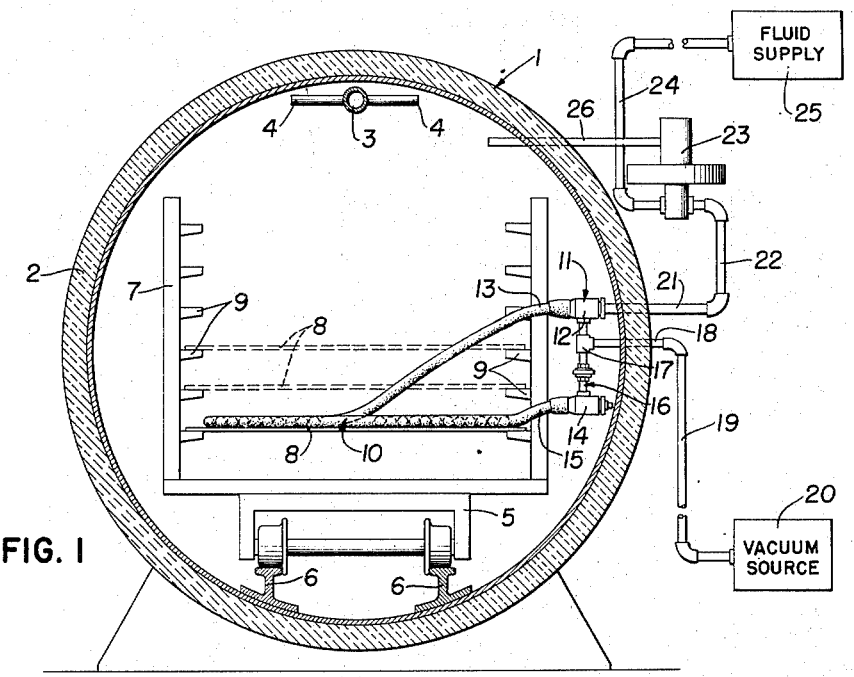
FIG. 1
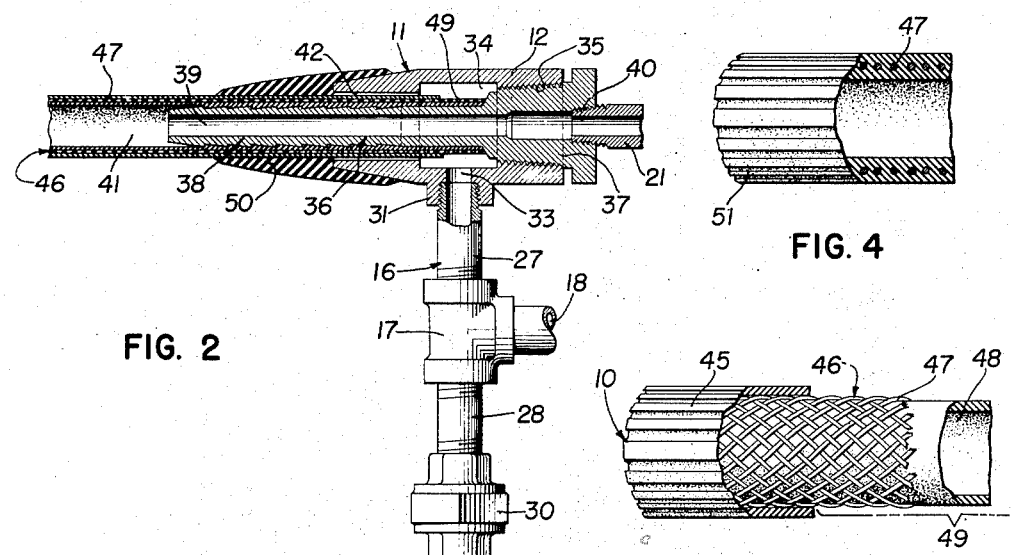
FIG. 2        FIG. 4
FIG. 3
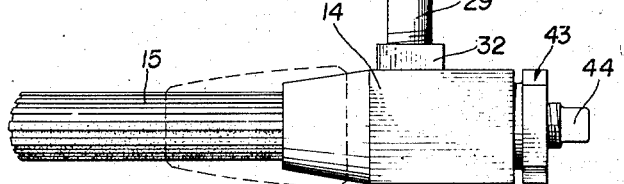
*INVENTOR.*
HAROLD A. FREEMAN
ATTORNEY Patented Oct. 10, 1950

2,525,662

UNITED STATES PATENT OFFICE 2,525,662

HOSE VULCANIZING APPARATUS

Harold A. Freeman, Akron, Ohio, assignor to Wingfoot Corporation, Akron, Ohio, a corporation of Delaware Application May 7, 1948, Serial No. 25,681

10 Claims. (Cl. 18—6)

The present invention relates to apparatus for the vulcanization of hose and the like. More particularly, the invention pertains to apparatus for curing hose or other similar forms of internally reinforced tubular products of natural or synthetic rubber according to a process embodying a differential in pressure between the fluid vulcanizing media applied internally and externally of the article being cured.

The established procedure for several years in the vulcanization of internally reinforced tubular rubber products such, for example, as braided hose having an interwoven cord ply therein, has been to encase the hose in a lead tube or jacket. This lead jacket is extruded as a tube about the uncured or green hose by means of a conventional lead press and forms the curing mold for the outer surface of the hose. Water under pressure is then introduced into the lead jacketed hose to provide the required internal pressure and while stored on reels, the hose is subjected to steam in a heater unit until the cure is completed, after which the lead is stripped off the cured hose.

This conventional practice is expensive in view of the cost of the equipment and the necessity to employ skilled labor, particularly when the annual production of such products is relatively small. Moreover, a high percentage of curing defects are traceable to difficulties arising in the leading operation. As a result, it has long been considered to be desirable to develop some process to avoid the necessity of using the lead press.

As alternatives, certain methods have been employed in recent years according to which internally reinforced hose has been vulcanized by the differential pressure type cure. According to this procedure, fluid under pressure is admitted internally of the assembled uncured hose and a heated curing medium at a slightly lower pressure is applied externally in a conventional heater unit to complete the cure. This process was found to produce a satisfactory product, but the cured hose was subject to frequent blows, blisters, and other blemishes caused by expansion of gases and moisture entrapped in the reinforcing ply.

It is a prime purpose of the present invention to facilitate the successful curing of hose products by insuring the proper venting of such gases and moisture from the hose in the course of the curing operation.

It is a further object of the present invention to provide a simple and economical form of apparatus to achieve the vulcanization of hose products with a minimum of defects.

A convenient form of apparatus embodying the teachings of the present invention is illustrated in the accompanying drawing in which Fig. 1 represents a vertical cross section through a typical heater unit showing the apparatus advantageously employed in the practice of the invention. Fig. 2 illustrates the bleeder connection shown in Fig. 1 in elevation on a somewhat larger scale with parts in section and broken away. Fig. 3 is a fragmentary illustration of an uncured or green hose with parts broken away to show the construction. Fig. 4 shows a fragmentary portion of cured hose.

In Fig. 1, the reference numeral 1 identifies generally the assembly of apparatus employed in completing the vulcanization of braided hose and the like. The assembly 1 comprises a heater unit 2 in the uppermost portion of which is disposed a supply line 3 extending lengthwise thereof for introducing steam under pressure to the interior of the heater unit. The supply line 3 is provided with a number of spaced outlets 4 which serve to distribute the steam introduced into the heater unit 2 by the supply line throughout the entire interior portion of the unit. A truck 5 is adapted to be moved into and out of the heater unit 2 on a pair of rails 6 mounted in the base of the unit. The truck 5 serves to support the green or unvulcanized rubber products in the interior of the unit during the vulcanizing operation.

The truck 5 is constructed in such a way as to provide a frame 7 which carries a plurality of metal pans 8 slidably supported upon bracket 9 secured to either side of the frame. Each of the pans 8, of which any desired number may be employed depending upon the size of the heater unit 2 and the facilities provided by the frame 7 on the truck 5, serves to support a coil or hose 10. It is desirable that the hose 10 be disposed on the pan 8 in a single spirally wound coil with both ends free and arranged in such a fashion that the individual coils will not lay across adjacent coils, thereby preventing disfiguration or flattening of the uncured hose. The degassing means or bleeder connection 11 embodying the teachings of the present invention is adapted to be supported internally of the heater unit 2 and is provided with a suitable receiving means or receptacle 12 in which one end 13 of the coiled hose 10 is inserted. A similar receiving means or receptacle 14 on the bleeder connection 11 is adapted to receive the other end 15 of the coiled hose in the manner shown in Fig. 1 of the drawing. A conduit 16 interconnects the receptacles 12 and 14 of the bleeder connection 11 and is provided with a T 17 intermediate the receptacles to which is connected a pipe outlet 18 extending through the outer wall of the heater unit 2 in a substantially horizontal plane.

The portion of the pipe outlet 18 which extends through the wall of the heater unit 2 is connected as by means of a conduit 19 to a suitable source of vacuum 20 which may take the form of a vacuum pump or the like (not shown). A pipe connection 21 secured to the receptacle 12 of the bleeder connection 11 also extends through the outermost wall of the heater unit 2 in substantially parallel relation to the pipe outlet 18. A conduit 22 is provided externally of the heater unit 2 for connecting the pipe connection 21 to one side of the diaphragm valve 23. The diaphragm valve 23 is also connected as by means of a conduit 24 to a suitable fluid supply 25 for supplying fluid such, for example, as air under pressure to the diaphragm valve.

A tube 26 extends through the outermost wall of the heater unit 2 and is connected at one end to the opposite side of the diaphragm valve 23 from that to which the conduits 22 and 24 are connected while the other end opens into the interior of the heater unit. The piping arrangement for the diaphragm valve 23 just described thus enables a careful control of the pressure of the fluid from the supply 25 introduced into the hose 10 by reason of the action of the steam pressure inside the heater unit 2 upon the diaphragm of the valve through the medium of the connecting tube 26. Any desired differential between the air pressure inside the hose 10 and the steam pressure inside the heater unit 2 acting on the exterior of the hose may be established by adjustably controlling the action of the diaphragm valve 23.

Before explaining the operation of the apparatus 1 of Fig. 1 in detail, it is desirable to consider first the construction of the bleeder connection 11 illustrated in Fig. 2 of the drawing. The conduit 16 interconnecting the receptacles 12 and 14 of the bleeder connection 11 is made up of a number of threaded nipples 27, 28, and 29 connected together by means of the T 17 and a union 30. One end of the nipple 27 is threaded into an internally threaded boss 31 on the receptacle 12 while the other end is threaded into the T 17. The nipple 28 joins the T 17 and the union 30. The nipple 29 connects the other end of the union with an internally threaded boss 32 on the receptacle 14.

A bore 33 extends through the internally threaded boss 31 and connects at its innermost end with a chamber 34 formed internally of the receptacle 12. A substantially identical construction is embodied in the receptacle 14. At one end of the chamber 34 in the receptacle 12 is an internally threaded bore 35 into which is inserted a fitting 36. The fitting 36 comprises an externally threaded end portion 37 for engagement with the bore 35 and an integrally formed tube 38 for insertion in the end 13 of the hose 10.

The fitting 36 is provided with a bore 39 extending throughout the length of the end portion 37 and the integrally formed tube 38. One end of the bore 39 in the end portion 37 of the fitting 36 is provided with an internal thread 40 which is threadably connected to the pipe connection 21 when the several elements are assembled in the heater unit 2. The tubular portion 38 of the fittings 36 is adapted to extend axially of the internal bore 41 of the hose 10, the end 13 of which is inserted through the bore 42 in that portion of the receptacle 12 directly opposite the internally threaded bore 35. A fitting 43 identical to the fitting 36 is provided in the receptacle 14 for engaging the end 15 of the hose 10. The fitting 43, instead of receiving a pipe connection 21 in the end portion thereof corresponding to end portion 37 of the fitting 36, has a pipe plug 44 inserted therein.

The green or unvulcanized hose 10, before the vulcanizing operation is begun, takes the form of the material illustrated in Fig. 3 in which a ribbed jacket 45 is loosely slipped over a braided or interwoven reinforcing ply 46 made up of a plurality of cords 47. The ply 46, in turn, encloses a tubular inner core 48. To facilitate the use of the bleeder connection 11, it is necessary to strip back a portion of the ribbed enclosing jacket 45 as indicated by the reference numeral 49 (Fig. 3) to expose a portion of the reinforcing ply 46 embodying the cords 47. The stripped portion 49 should be substantially equal in length to that of the chambers 34 of the receptacles 12 and 14 when the respective ends 13 and 15 of the hose 10 are inserted therein as indicated in Fig. 2.

After the ends 13 and 15 are inserted in place in the receptacles 12 and 14, respectively, a gum seal 50 is applied about the end of each of the receptacles surrounding the bore 42 through which each end of the hose is inserted. The seal 50 serves to prevent the entrance of the surrounding atmosphere into the chamber 34 under the influence of the vacuum supplied to the connecting conduit 16 during the operation of the apparatus. The cured hose 51 illustrated in Fig. 4 of the drawing represents a typical section of the hose following the vulcanizing operation and illustrates the thoroughness of the impregnation of the reinforcing ply 46 by the rubber contained in the ribbed jacket 45 and the tubular core 48 locking the individual cords 47 in place in the body of the finished hose and leaving a smooth internal passage extending axially thereof.

In the operation of the apparatus, the uncured hose 10 is introduced into the heater unit 2 and all the connections are made in the manner illustrated in Fig. 1 of the drawings as described hereinabove. A slight vacuum is then applied by means of the vacuum source 20 to the conduit 19. A vacuum is thus built up in pipe outlet 18, conduit 16, and chambers 34 of the receptacles 12 and 14 so as to draw any gases or moisture present or created during vulcanization in the exposed reinforcing ply 46 in the stripped portions 49 of the ends 13 and 15 of the unvulcanized hose 10 into the chambers 34. The vacuum is applied continuously throughout the cure. The gases and moisture which would, if not removed, create defects in the finished hose are thus wicked out of the braided cord, released in the chambers 34, and withdrawn therefrom. Vacuum may or may not be necessary, depending on the hose make-up.

Steam is introduced through the supply line 3 to the interior of the heater unit 2 until the atmosphere therein is substantially completely saturated. Air or other fluid under pressure is simultaneously introduced to the diaphragm valve 23 from the fluid supply 25 and a pressure is built up internally of the hose 10, the air being supplied by the pipe connection 21 and conduit 22 at a rate sufficient to exceed the pressure of the steam internally of the heater unit 2 by approximately two pounds per square inch. This pressure differential is maintained throughout the entire curing operation. The pressure differential may be varied to fit the type of hose.

It will be readily apparent that as the steam pressure is built up within the heater unit 2, the diaphragm valve 23 being exposed to the atmosphere within the heater unit by means of the tube 26, will operate upon adjustment to admit air under pressure to the bore 41 of the hose 10, at any desired rate to maintain any predetermined pressure differential between the inside and outside of the hose. It has been found that optimum conditions are achieved with a maximum air pressure of fifty-two pounds employed in the hose 10 for a corresponding fifty pound maximum pressure of steam employed in the heater unit. This pressure differential is advantageously maintained until the completion of the cure. At the end of the curing operation, the pressures are reduced from the maximum at the same differentials.

It will be understood that certain modifications may be made in the apparatus hereinabove described without in any way departing from the spirit or scope of the invention. While it is desirable that a slight vacuum be applied to the bleeder connection 11 to insure the maximum efficiency in the withdrawal of gases and moisture from the reinforcing ply 46 of the hose 10, it is possible with certain types and sizes of hose to simply vent the pipe outlet 18 to the outside atmosphere. In addition, various forms of diaphragm valves may be employed in the combination of apparatus without affecting the operation of the system. Moreover, other suitable forms of bleeder connections than the bleeder connection 11 may be employed to afford the suitable connections for the ends 13 and 15 of the hose with the supplies of fluid and vacuum.

While in accordance with the Patent Statutes one best known embodiment of the invention has been illustrated and described in detail, it is to be particularly understood that the invention is not limited thereto or thereby, but that the inventive scope is defined in the appended claims.

I claim:

1. A bleeder connection for use in the differential curing of hose and the like, said connection comprising a pair of hollow receiving means one for one end and one for the other end of the hose, said receiving means having a chamber therein to encompass at least a portion of the end of the hose; tubular means in one of the receiving means for insertion in one end of the hose, said tubular means being connected to a supply of fluid under pressure; a second tubular means in the other receiving means for insertion in the other end of the hose providing a substantially fluid-tight seal therefor; conduit means interconnecting the chambers; and evacuating means connected to the conduit means.

2. A bleeder connection for use in the differential curing of hose and the like, said connection comprising receiving means for one end of the hose and receiving means for the other end of the hose; means in one of the receiving means for introducing fluid under pressure to the interior of the hose; means in the other receiving means providing a substantially fluid-tight closure for the interior of the hose; a chamber in each receiving means into which the end of the hose extends, said chamber encompassing the end of the hose; and means interconnecting the chambers for venting the same.

3. A bleeder connection for use in the differential curing of hose and the like, said connection comprising receiving means for one end of the hose and receiving means for the other end of the hose; means in one of the receiving means for introducing fluid under pressure to the interior of the hose; means in the other receiving means providing a substantially fluid-tight closure for the interior of the hose; a chamber in each receiving means into which the end of the hose extends, said chamber surrounding at least a portion of the hose end; conduit means interconnecting the chambers; and means venting the chambers through the conduit.

4. A bleeder connection for use in the differential curing of hose and the like, said connection comprising receiving means for one end of the hose and receiving means for the other end of the hose; means in one of the receiving means for introducing fluid under pressure to the interior of the hose; means in the other receiving means providing a substantially fluid-tight closure for the interior of the hose; a chamber in each receiving means into which the end of the hose extends, said chamber encompassing at least a portion of the exterior of the hose end; means providing an outlet for each chamber; a conduit connecting the outlet means; and means connected to the conduit for creating a vacuum in the chambers.

5. A bleeder connection for use in the differential curing of hose and the like, said connection comprising receiving means for one end of the hose and receiving means for the other end of the hose; means in one of the receiving means for introducing fluid under pressure to the interior of the hose; means in the other receiving means providing a substantially fluid-tight closure for the interior of the hose; a chamber in each receiving means into which the end of the hose extends, said chamber surrounding the exterior of at least a portion of the hose end; a common conduit interconnecting the chambers in the receiving means; and means connected to the conduit for creating a vacuum in each chamber.

6. A bleeder connection for use in the differential curing of hose and the like, said bleeder connection comprising a receptacle for one end of the hose; a receptacle for the other end of the hose; a chamber in each receptacle encompassing the exterior of the end of the hose inserted therein; means in one of the receptacles for introducing fluid under pressure to the interior of that end of the hose inserted therein; means in the other receptacle for providing a substantially fluid-tight closure for the interior of the hose at the other end thereof; a conduit interconnecting the chambers; and means connected to the conduit for evacuating the chambers.

7. A bleeder connection for use in the differential curing of hose comprising a receptacle for one end of the hose; a receptacle for the other end of the hose; a chamber in each receptacle encompassing the exterior of the end of the hose inserted therein; means in one of the receptacles and extending through the chamber therein for introducing fluid under pressure to the inner core of that end of the hose inserted therein; means extending through the chamber in the other receptacle for providing a substantially fluid-tight closure for the inner core of the hose at the other end thereof; a conduit interconnecting the chambers; means connected to the conduit for evacuating the chambers.

8. In a hose vulcanizing apparatus, a connection for the ends of the hose to be vulcanized, said connection comprising a pair of receptacles, one for the reception of one end and the other for the other end of the hose; a chamber formed internally of each receptacle, said chamber encompassing the end of the hose inserted therein; tubular means in each receptacle extending through the chamber therein for insertion in the end of the hose disposed in said chamber; and means interconnecting the chambers of the receptacles.

9. In a hose vulcanizing apparatus a connection for the ends of the hose to be vulcanized, said connection comprising a pair of receptacles, one for reception of one end and the other for the other end of the hose; a chamber disposed internally of each receptacle, said chamber encompassing the end of the hose disposed therein; a plug member in each receptacle; a generally tubular portion on the plug member extending through the chamber for insertion in the end of the hose disposed therein; and means interconnecting the chambers of the receptacles.

10. In a hose vulcanizing apparatus a connection for the ends of the hose to be vulcanized, said connection comprising a pair of receptacles, one for the reception of one end and the other for the other end of the hose; a male member of generally tubular form in each of the receptacles for insertion in an end of the hose; a chamber formed internally of each receptacle, said chamber encompassing the end of the hose therein and surrounding at least a portion of the male member; and means interconnecting the chambers of the receptacles.

HAROLD A. FREEMAN.

REFERENCES CITED

The following references are of record in the file of this patent:

UNITED STATES PATENTS

| Number | Name | Date |
|---|---|---|
| 168,087 | Forsyth | Sept. 28, 1875 |
| 1,773,138 | Gammeter | Aug. 19, 1930 |
| 2,226,768 | Harrison | Dec. 31, 1940 |